(12) United States Patent  
Partin et al.

(10) Patent No.: US 8,003,241 B2
(45) Date of Patent: Aug. 23, 2011

(54) LITHIUM BATTERY WITH EXTERNAL POSITIVE THERMAL COEFFICIENT LAYER

(75) Inventors: Phillip E. Partin, Grafton, MA (US); Yanning Song, Shrewsbury, MA (US)

(73) Assignee: Boston-Power, Inc., Westborough, MA (US)

( * ) Notice: Subject to any disclaimer, the term of this patent is extended or adjusted under 35 U.S.C. 154(b) by 1245 days.

(21) Appl. No.: 11/474,081

(22) Filed: Jun. 23, 2006

(65) Prior Publication Data

US 2007/0298314 A1    Dec. 27, 2007

(51) Int. Cl.  
*H01M 2/04* (2006.01)

(52) U.S. Cl. .............................. 429/62; 429/61; 429/7

(58) Field of Classification Search ............... 429/62, 429/121, 181  
See application file for complete search history.

(56) References Cited

U.S. PATENT DOCUMENTS

| | | | |
|---|---|---|---|
| 4,028,478 A | 6/1977 | Tucholski | |
| 4,943,497 A | 7/1990 | Oishi et al. | |
| 5,418,082 A | 5/1995 | Taki et al. | |
| 5,504,415 A | 4/1996 | Podrazhansky et al. | |
| 5,565,756 A | 10/1996 | Urbish et al. | |
| 5,694,021 A | 12/1997 | Morioka et al. | |
| 5,783,326 A | 7/1998 | Hasebe | |
| 5,883,498 A | 3/1999 | Van Beek et al. | |
| 5,993,990 A * | 11/1999 | Kanto et al. | 429/62 |
| 6,030,726 A | 2/2000 | Takeuchi et al. | |
| 6,087,036 A | 7/2000 | Rouillard et al. | |
| 6,114,835 A | 9/2000 | Price | |
| 6,143,442 A * | 11/2000 | Takahashi et al. | 429/179 |
| 6,159,636 A | 12/2000 | Wang et al. | |
| 6,204,635 B1 | 3/2001 | Sullivan | |
| 6,232,015 B1 | 5/2001 | Wyser | |
| 6,265,107 B1 | 7/2001 | Shimizu et al. | |
| 6,346,344 B1 | 2/2002 | Song et al. | |
| 6,534,216 B1 | 3/2003 | Narukawa et al. | |
| 6,727,203 B2 | 4/2004 | Ichikawa | |
| 6,759,152 B2 | 7/2004 | Iwaizono et al. | |
| 6,767,667 B1 | 7/2004 | Ooshima | |
| 6,805,991 B2 | 10/2004 | Abe | |
| 6,808,844 B2 | 10/2004 | Ehara | |
| 6,900,616 B2 * | 5/2005 | Burrus et al. | 320/147 |
| 7,175,935 B2 | 2/2007 | Welsh | |

(Continued)

FOREIGN PATENT DOCUMENTS

CN    1262532 A    8/2000

(Continued)

OTHER PUBLICATIONS

Extended European Search Report, Application No. EP 10179769.4 dated Mar. 23, 2011, 8 pp.

(Continued)

*Primary Examiner* — Barbara Gilliam  
*Assistant Examiner* — Maria J Laios  
(74) *Attorney, Agent, or Firm* — Hamilton, Brook, Smith & Reynolds, P.C.

(57) ABSTRACT

A lithium-ion battery includes a first terminal in electrical communication with a first electrode of the battery, a second terminal in electrical communication with a second electrode of the battery, a cell casing that includes a lid electrically connected to the cell casing, and a positive thermal coefficient (PTC) layer in electrical communication with the first terminal and over the lid of the cell casing. A battery pack includes a plurality of such lithium-ion batteries as described above.

22 Claims, 7 Drawing Sheets

U.S. PATENT DOCUMENTS

| | | |
|---|---|---|
| 7,763,386 B2 | 7/2010 | Hosoya et al. |
| 2002/0004169 A1 | 1/2002 | Yamada et al. |
| 2002/0142195 A1 | 10/2002 | Ehara |
| 2002/0192552 A1 | 12/2002 | Lampe-Onnerud et al. |
| 2003/0077486 A1 | 4/2003 | Iwaizono et al. |
| 2003/0180615 A1 | 9/2003 | Johnson et al. |
| 2005/0214634 A1 | 9/2005 | Kim |
| 2005/0233217 A1 | 10/2005 | Fujihara et al. |
| 2006/0035151 A1 | 2/2006 | Kumeuchi et al. |
| 2006/0044728 A1 | 3/2006 | Kim et al. |
| 2006/0051666 A1 | 3/2006 | Kim |
| 2006/0071637 A1 | 4/2006 | Heo et al. |
| 2006/0127756 A1 | 6/2006 | Seo |
| 2006/0251930 A1 | 11/2006 | Kim |
| 2006/0257745 A1 | 11/2006 | Choi et al. |
| 2006/0269835 A1* | 11/2006 | Song ............................ 429/142 |
| 2007/0020509 A1 | 1/2007 | Kim |
| 2007/0026315 A1 | 2/2007 | Lampe-Onnerud et al. |
| 2007/0202396 A1 | 8/2007 | Jung |

FOREIGN PATENT DOCUMENTS

| | | |
|---|---|---|
| EP | 1 022 792 A1 | 7/2000 |
| EP | 1 320 137 A2 | 6/2003 |
| EP | 1 383 183 A1 | 1/2004 |
| EP | 1 403 942 A1 | 3/2004 |
| EP | 1 482 577 A1 | 12/2004 |
| EP | 1 885 011 A | 2/2008 |
| JP | 11 003698 A | 1/1999 |
| JP | 2001 22993 A | 8/2001 |
| JP | 2002 042816 A | 2/2002 |
| JP | 2002 075369 A | 3/2002 |
| JP | 2003 168430 A | 6/2003 |
| JP | 2004 006094 A | 1/2004 |
| JP | 2004 259675 A | 9/2004 |
| JP | 2005346945 A | 12/2005 |
| WO | WO 98/24131 A | 6/1998 |
| WO | WO 2004/105162 A | 12/2004 |
| WO | WO 2006/071972 A2 | 7/2006 |
| WO | WO 2007/072759 A | 6/2007 |

OTHER PUBLICATIONS

Notice of Allowance, U.S. Appl. No. 12/214,535, date of mailing Jul. 16, 2010.

First Office Action, Chinese Patent Application No. 200780023195.X, date of mailing Jun. 10, 2010.

Notice of Allowance, U.S. Appl. No. 11/821,102, date of mailing Sep. 10, 2010.

Office Action, U.S. Appl. No. 12/317,487, date of mailing Dec. 8, 2009.

Invitation to Pay Additional Fees and, Where Applicable, Protest Fee, International Application No. PCT/US2009/040846, date of mailing Aug. 14, 2009.

International Preliminary Report on Patentability, International Application No. PCT/US2009/040846, date of mailing Jul. 29, 2010.

International Search Report and Written Opinion of the International Searching Authority, or the Declaration, International Application No. PCT/US2009/040846, date of mailing Oct. 2, 2009.

Invitation to Pay Additional Fees and, Where Applicable, Protest Fee and Written Opinion, International Application No. PCt/US2009/040845, date of mailing Oct. 2, 2009.

International Search Report and Written Opinion of the International Searching Authority, or the Declaration, International Application No. PCT/US2009/040845, date of mailing Feb. 3, 2010.

Notice of Allowance, U.S. Appl. No. 11/485,068, date of mailing Jun. 11, 2010.

Office Action, U.S. Appl. No. 12/651,024, date of mailing Nov. 24, 2010.

Office Action, Chinese Application No. 200580045007.4, date of mailing Apr. 23, 2010.

Office Action, Chinese Application No. 200680055431.1, date of mailing Nov. 12, 2010.

Supplemental Notice of Allowability, U.S. Appl. No. 11/485,068, date of mailing Aug. 31, 2010.

* cited by examiner

LITHIUM BATTERY WITH EXTERNAL POSITIVE THERMAL COEFFICIENT LAYER

BACKGROUND OF THE INVENTION

A positive thermal coefficient (PTC) layer is typically employed in a secondary battery, such as a lithium-ion secondary battery, to provide protection against short circuits external to the battery (or cell), i.e., interrupting the current path when an overcurrent or an overvoltage is supplied.

A typical PTC layer includes material(s) having an increasing electrical resistivity with increasing temperature. They generally include small quantities of semiconductor material in a polycrystalline ceramic, or a slice of plastic or polymer with carbon grains embedded in it. When temperature reaches a critical point, the semiconductor material or the plastic with embedded carbon grains forms a barrier to the flow of electricity and resistance climbs very quickly. The temperature at which this occurs can be varied by adjusting the composition of the PTC materials. This on-off behavior of PTC materials is useful in situations where equipment can be damaged by easily definable events, such as batteries, including secondary lithium-ion batteries. For example, when exposed to an overcurrent situation, this normally conductive PTC layer heats up and changes phases to become several orders of magnitude more resistive. Once the short circuits are removed, the PTC layer cools down and returns to its electrically conductive state.

Typically, such PTC layers require their surface area to increase in order to increase the operating current rating of batteries. That is, for high current charging rates in batteries, in particular batteries having a capacity of greater than about 3.0 Ah/cell, PTC layers with relatively large surface areas are generally required. Generally, however, in batteries integrated with PTC layers in the art, the PTC layers have been incorporated within the batteries, thereby significantly limiting their surface area, while occupying the space within the batteries, thereby also reducing the capacity of the batteries.

Therefore, there is a need for a new battery design to accommodate a PTC layer having a relatively large surface area, for example, to maximize the current capability of the PTC layer for a given cell.

SUMMARY OF THE INVENTION

The present invention generally relates to a lithium-ion battery integrated with one or more PTC layers external to the cell casing of the battery, to a battery pack including a plurality of such batteries (or cells), and to a method of preparing such a battery.

In one embodiment, the present invention is directed to a lithium-ion battery that includes a first terminal in electrical communication with a first electrode of the battery; a second terminal in electrical communication with a second electrode of the battery; a cell casing that includes a lid electrically connected to the cell casing; and a PTC layer in electrical communication with the first terminal and over the lid of the cell casing. Preferably, the lithium-ion battery further includes a first conductive layer and a second conductive layer where the PTC layer is between the first and second conductive layers. Preferably, at least a portion of the first conductive layer is at least a component of the second terminal, or is electrically connected to the first terminal, more preferably a component of the second terminal.

In another embodiment, the present invention is directed to a battery pack that includes a plurality of lithium-ion cells, where each of the cells includes features as described above for a lithium-ion battery of the invention.

The present invention also includes a method of producing a lithium-ion battery as described above. The method includes forming a cell casing that includes a lid electrically connected to the cell casing. The cell casing is electrically insulated from a first terminal and in electrical communication with a second terminal. A first electrode in electrical communication with the first terminal, and a second electrode in electrical communication with the second terminal are disposed in the cell casing. The method further includes disposing a laminate over the cell casing. The laminate includes a first conductive layer over the cell casing, a second conductive layer and a PTC layer between the first and second conductive layers. The laminate is in electrical communication with the first terminal of the battery, and is electrically insulated from the cell casing. At least a portion of the first conductive layer is at least a portion of the first terminal, or is electrically connected to the first terminal.

With the invention, a PTC layer, having a relatively large surface area, e.g., greater than the surface area of the terminal with which the PTC layer is in electrical communication, can be integrated into a lithium-ion battery with a minimized increase in the height of the battery. Such a large surface area is advantageous because it can allow a relatively high current flow in batteries. That is, relatively high current charging rates can be achieved in batteries of the invention, in particular batteries having a capacity of greater than about 3.0 Ah/cell. In addition, with the present invention where a PTC layer is disposed externally to the cell casing of battery, additional space can be available within the cell casing to accommodate more active cathode and anode materials (e.g., jelly rolls), thereby allowing higher capacity.

DETAILED DESCRIPTION OF THE INVENTION

Figure 1:
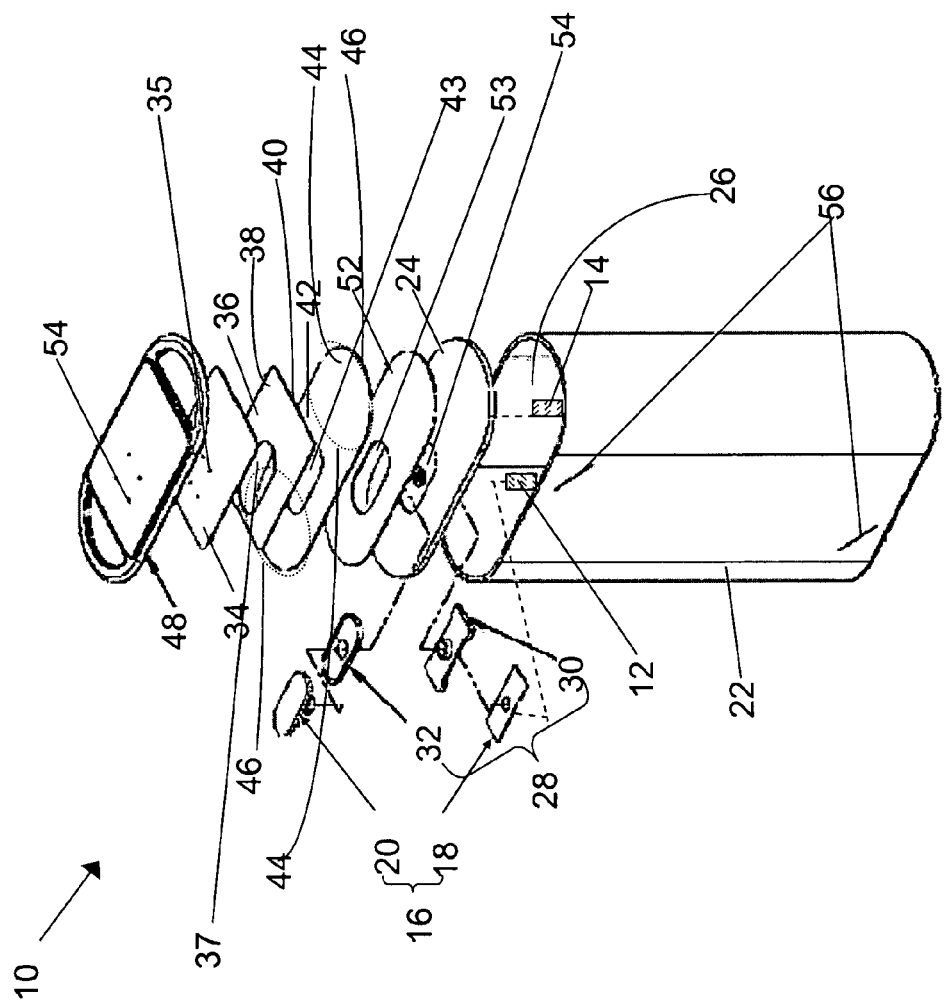
FIG. 1 is an exploded representation of one embodiment of a lithium-ion battery of the invention.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

In the present invention, one or more PTC layers are integrated into a lithium-ion battery, and are positioned externally to the cell casing of the battery. As used herein, the "PTC layer(s) integrated into a lithium-ion battery" means that the PTC layer(s) is incorporated into the battery as a component, as opposed to a PTC layer in a separate unit, which is connected to a lithium-ion battery via electrically conductive tab(s) or wire(s).

As used herein, the "terminals" of the batteries of the invention means the parts or surfaces of a battery to which external electric circuits are connected.

The lithium-ion batteries of the invention typically include a first terminal in electrical communication with a first electrode, and a second terminal in electrical communication with a second electrode. The first and second electrodes are contained within the cell casing of a lithium-ion battery of the invention, for example, in a "jelly roll" form. The first terminal can be either a positive terminal in electrical communication with a positive electrode of the battery, or a negative terminal in electrical communication with a negative electrode of the battery, and vice versa for the second terminal. Preferably, the first terminal is a negative terminal in electrical communication with a negative electrode of the battery, and the second terminal is a positive terminal in electrical communication with a positive electrode of the battery.

As used herein, the phrase "electrically connected" or "in electrical communication" means certain parts are in communication with each other by flow of electrons through conductors, as opposed to electrochemical communication which involves flow of ions, such as $Li^+$, $H^+$ and $OH^-$, through electrolytes.

As shown in FIG. 1, lithium-ion battery 10 includes first electrode 12 and second electrode 14. First electrode 12 is electrically connected to feed-through device 16, which includes first component 18, which is proximal to first electrode 12, and second component 20, which is distal to first electrode 12. As used herein, the term "feed-through" includes any material or device that connects an electrode of a battery within a space defined by a casing and lid of a battery, with a component of the battery external to that defined internal space. Preferably, the feed-through material or device extends through a pass-through hole defined by a lid of the battery. Benefits of using such a feed-though device for electrical connections in batteries include prevention of internal shorts during and subsequent to manufacture, and easier manufacturing. An additional benefit of using such a feed-through device includes a potential increase (e.g., 5-15%) in cell capacity due to increased volume utilization, as compared to that of a conventional lithium battery in which current-carrying tabs are folded or bent into a cell casing and are welded with internal electrodes. A feed-through device also can pass through a lid of a cell casing of a battery without deformation, such as bending, twisting and/or folding, and can increase cell capacity.

Cell casing 22 and lid 24 define interior space 26 of lithium-ion battery 10. Cell casing 22 can be made of any conductive materials which are essentially stable electrically and chemically at a given voltage of lithium-ion batteries, such as the lithium-ion batteries of the invention. Examples of suitable materials of cell casing 22 include aluminum, nickel, copper, steel and combinations thereof. Preferably, cell casing 22 is of, or includes, aluminum. Examples of suitable materials of lid 24 are the same as those listed for cell casing 22. Preferably lid 24 is made of the same material as cell casing 22. In a more preferable embodiment, both cell casing 22 and lid 24 are formed of, or include, aluminum.

At least one of cell casing 22 and lid 24 are in electrical communication with second electrode 14 of lithium-ion battery 10.

Feed-through device 16 is electrically insulated from lid 24 by insulating gasket 28, which includes first insulating component 30 and second insulating component 32. Insulating gasket is formed of a suitable insulating material, such as polypropylene, polyvinylfluoride (PVF), etc. It is understood that any other type of insulating means can also be used for insulating feed-through device 16 from lid 24. Feed-through device 16 is in contact at first component 20 with first conductive layer 34. First conductive layer 36 typically is formed of nickel and has a thickness in a range of between about 0.05 mm and about 0.3 mm. First conductive layer 36 can be formed suitable methods known in the art. First conductive layer 34 is also in contact with positive thermal coefficient layer (PTC layer) 36. Suitable PTC materials are those known in the art. Generally, suitable PTC materials are those that, when exposed to an electrical current in excess of a design threshold, its electrical conductivity decreases with increasing temperature by several orders of magnitude (e.g., $10^4$ to $10^6$ or more). Once the electrical current is reduced below a suitable threshold, in general, the PTC material substantially returns to the initial electrical resistivity. In one suitable embodiment, the PTC material includes small quantities of semiconductor material in a polycrystalline ceramic, or a slice of plastic or polymer with carbon grains embedded in it. When the temperature of the PTC material reaches a critical point, the semiconductor material or the plastic or polymer with embedded carbon grains forms a barrier to the flow of electricity and causes electrical resistance to increase precipitously. The temperature at which electrical resistivity precipitously increases can be varied by adjusting the composition of the PTC material, as is known in the art. An "operating temperature" of the PTC material is a temperature at which the PTC exhibits an electrical resistivity about half way between its highest and lowest electrical resistance. Preferably, the operating temperature of the PTC layer employed in the invention is between about 70° Celsius and about 150° Celsius.

Examples of specific PTC materials include polycrystalline ceramics containing small quantities of barium titanate ($BaTiO_3$), and polyolefins including carbon grains embedded therein. Examples of commercially available PTC laminates that include a PTC layer sandwiched between two conducting metal layers sandwiched between two conducting metal layers include LTP™ series manufactured by Raychem Co. Generally, PTC layer 36 has a thickness in a range of about 50 μm and about 300 μm. Preferably, PTC layer 36 includes electrically conductive surfaces 38 and 40 that are each at least as the same or greater than the surface area of a terminal of lithium-ion battery 10 associated with first electrode 12. In particular examples, at least one of electrically conductive surfaces 38 and 40 is at least 105%, 110%, or 150% of the surface area of a terminal of lithium-ion battery 10 associated with first electrode 12.

Figure 2:
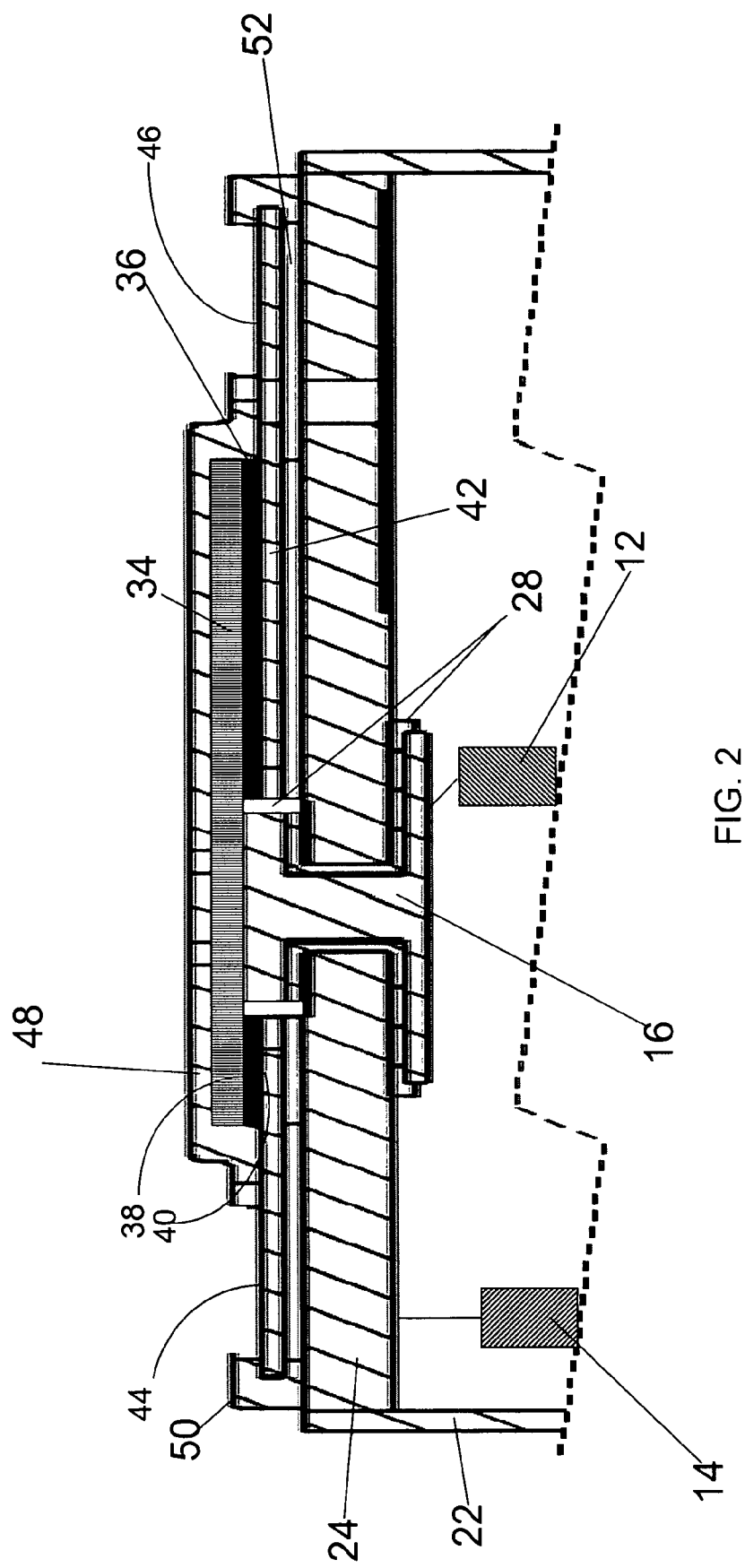
FIG. 2 is a cross-sectional view of the lithium-ion battery of FIG. 1.

As can be seen in FIG. 2, PTC layer 36 contacts first conductive layer 34 at its electrically conductive surface 38. Insulating gasket 28 electrically insulates feed-through device 16 from PTC layer 36. It is understood that other suitable means for insulating feed-through device 16 from PTC layer 36 can also be used in the invention. PTC layer 36 is in contact at electrically conductive surface 40 with second conductive layer 42. Preferably, second conductive layer 42 is formed by the same method as first conductive layer 34. Examples of suitable thicknesses of second conductive layer 42 are those in a range of between about 0.05 mm and about 0.3 mm.

Suitable materials for first and second conductive layers 34 and 42 include aluminum, nickel, copper, steel and combinations thereof. In one embodiment, first and second conductive layers 34 and 42 are formed of, or include, the same material, such as nickel.

Optionally, cover 48 partially supports second conductive layer 42 at rim 50 defined by cover 48. Second conductive layer 42 also is insulated from lid 24 by insulating layer 52 which is located between second conductive layer 42 and lid 24. Suitable materials for insulating layer 52 includes air, plastic, papers, non-conductive glues, etc.

Preferably, cover 48 is of a non-conductive material. Alternatively, cover 48 can be partitioned from first conductive layer 42, PTC layer 36 and second conductive layer 42, such as by a suitable electrically insulating film, whereby cover 48 is in electrical contact with cell casing 22 or lid 24 and can thereby act as a second terminal.

Figure 3:
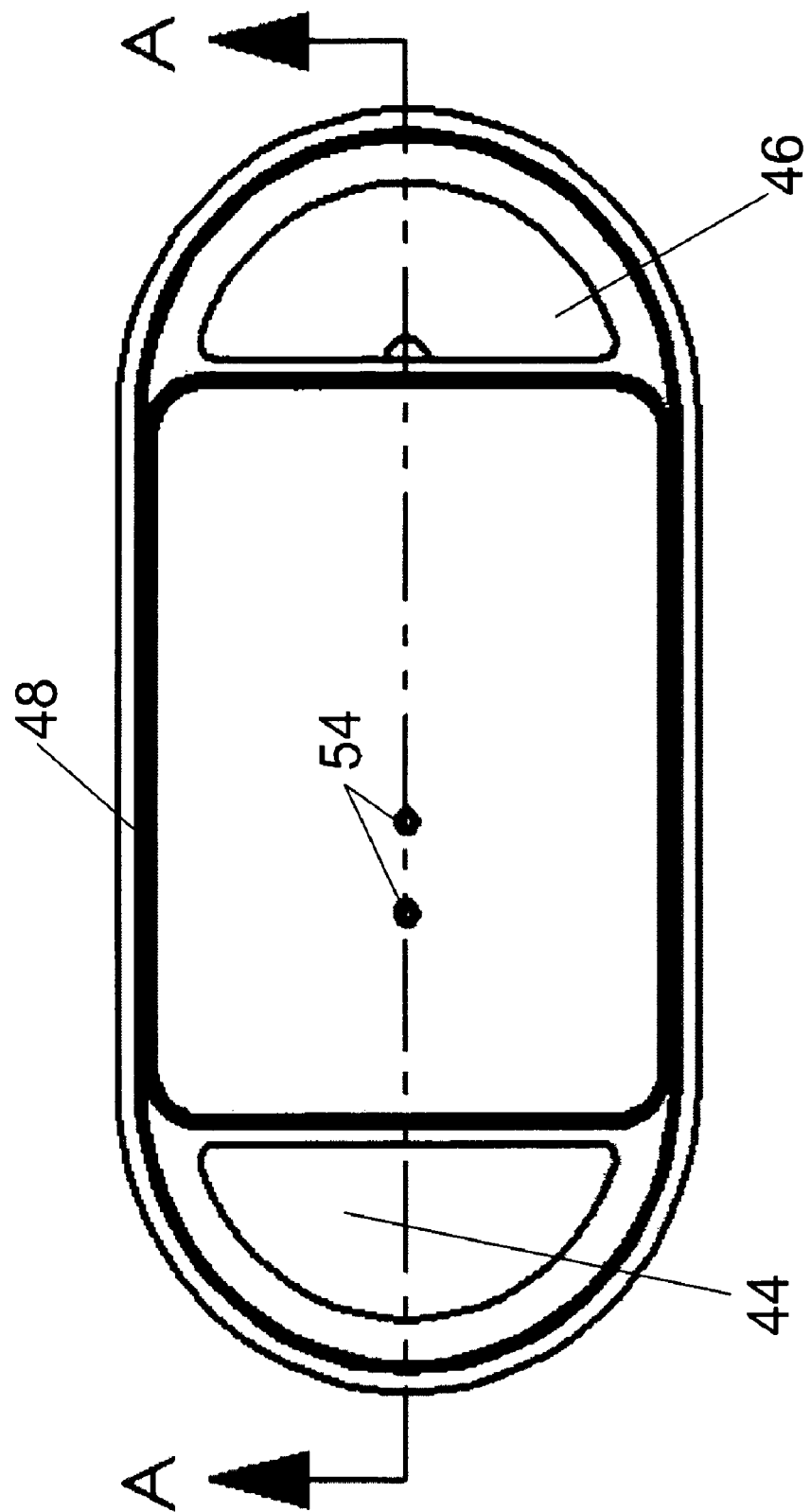
FIG. 3 is a top view of the lithium-ion battery of FIG. 1.

Preferably, at least one surfaces 44 and 46 of second conductive layer 42 represents a first terminal of lithium ion battery 10 and are defined by opening 54 of cover 48, as shown in FIG. 3. Opening 54 provides access for first conductive layer 34 and at least one opening 35 defined by first conductive layer 34 to thereby weld first conductive layer 34 to feed-through device 16 during fabrication of lithium ion battery 10.

Cell casing 22 includes at least one vent score 56 as a means for venting interior space 26 when necessary, such as when gas within lithium ion battery 10 is greater than a value of between about 10 and about 20 kg/cm$^2$. It is to be understood that any suitable type of venting means can be employed as long as the means provide hermetic sealing in normal battery operation conditions. Various suitable examples of venting means are described in U.S. Provisional Application No. 60/717,898, filed on Sep. 16, 2005, the entire teachings of which are incorporated herein by reference.

Referring back to FIG. 1, specific examples of venting means include vent scores, such as vent score 56 shown in FIG. 1. As used herein, the term "score" means partial incision of section (as) of a cell casing, such as cell casing 22, that is designed to allow the cell pressure and any internal cell components to be released at a defined internal pressure, (e.g., between about 10 and about 20 kg/cm$^2$). Preferably, vent score 56 is directionally positioned away from a user/or neighboring cells. As shown, more than one vent score can be employed. In some embodiments, pattern vent scores can be employed. Vent score 56 can be parallel, perpendicular, diagonal to a major stretching (or drawing) direction of the cell casing material during creation of the shape of cell casing 22. Consideration is also given to vent score properties, such as depth, shape and length (size).

Other examples of venting means that can be employed in the invention include one or more mechanical supports positioned at an internal or external wall portion of the cell casing to increase the mechanical strength of the cell casing, whereby release of gas pressure is located at a portion of batteries distinct from the mechanical support. Such a mechanical support can serve to increase the strength of the cell casing by directing a mechanical support to areas of greatest need to prevent cell deformation for a defined range of pressure that do not exceed those that would be desired to allow venting. In this embodiment, release of gas pressure is thus located to a portion of the cell distinct from the mechanical support. In a preferred embodiment, the mechanical support is a belt spanning internal or external circumference of the cell casing. The mechanical support can further serve as an electrical connection to and from neighboring batteries. In addition, the mechanical support can further serve as a labeling of the batteries. Any standard materials used for lithium-ion cell casings, such as Al, steel and stainless steel, can be used for the mechanical supports. Alternatively, a material having a high tensile strength, such as Ni or a non-metallic material, such as a polymeric material, can be used. More than one high tensile material can also be used. When the mechanical support(s) is positioned externally, a choice of suitable materials need not consider electrochemical stability, which is typically required for cell can materials.

Additional examples of venting means that can be employed in the invention include at least one predetermined, low-strength area positioned on the cell. The predetermined, low-strength area has a weaker mechanical strength than that of at least one other area of a battery, and the low-strength area causes release of gas pressure at a location of the battery that is independent of a source of gas within the battery. Such a low-strength area has a weaker mechanical strength than that of at least one other area of the cell casing.

Figure 4A:
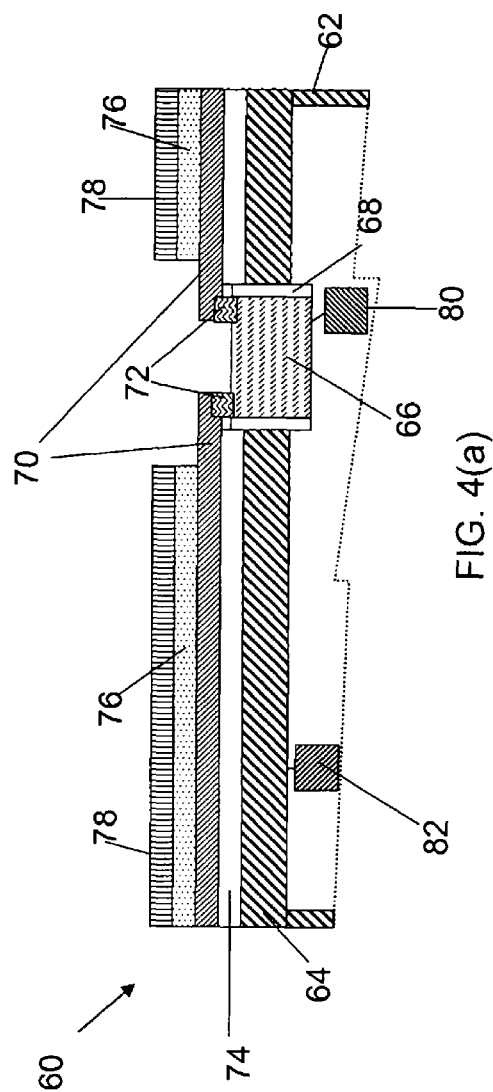
FIGS. 4(a) and 4(b) are schematic cross-sectional views of other embodiments of the lithium-ion batteries of the invention.
Figure 4B:
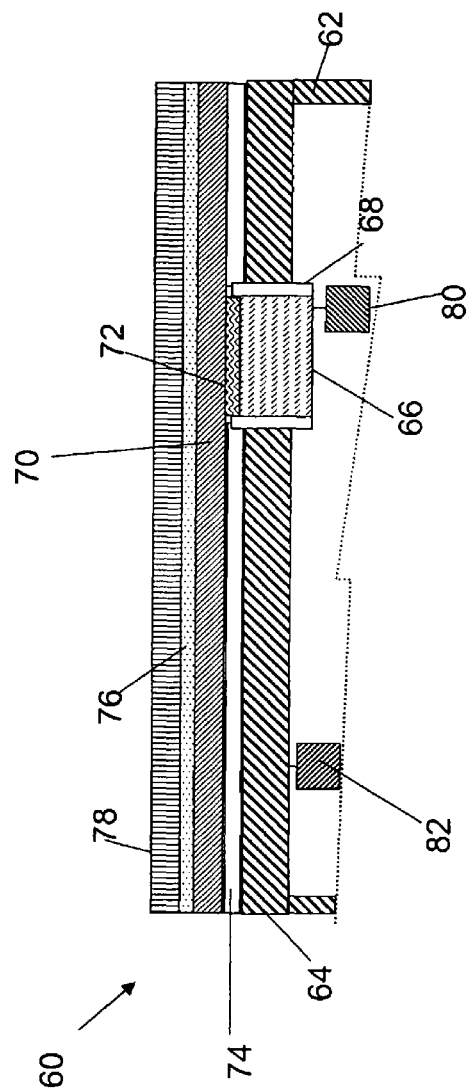

FIGS. 4A and 4B represent other embodiments of the lithium ion batteries of the invention. As shown therein, lithium ion battery 60 includes cell casing 62 and lid 64, feed-through device 66 extends through lid 64 and is electrically insulated from lid 64 by insulating gasket 68. First conductive layer 70 is in electrical contact with feed-through device 66. Electrical contact between feed-through device 66 and first conductive layer 70 can be formed by electrically conductive bridge 72, such as welding or layer(s) of a conductive adhesive. First conductive layer 70 is electrically insulated from lid 64 by insulating layer 74.

Feed-through device 66 is in electrical contact with first electrode 80 of lithium ion battery 60. Second electrode 82 of lithium ion battery 60 is in electrical contact with cell casing 62 or lid 64.

Positive thermal coefficient layer 76 is supported by first conductive layer 70. In one embodiment, first conductive layer 70 has a surface area greater than that of PTC layer 76. Second conductive layer 78 is supported by PTC layer 76, and optionally has substantially the same surface area as that of PTC layer 76. The materials and thicknesses of components shown in FIGS. 4A and 4B are the same as those described with respect to FIGS. 1-3.

Figure 5:
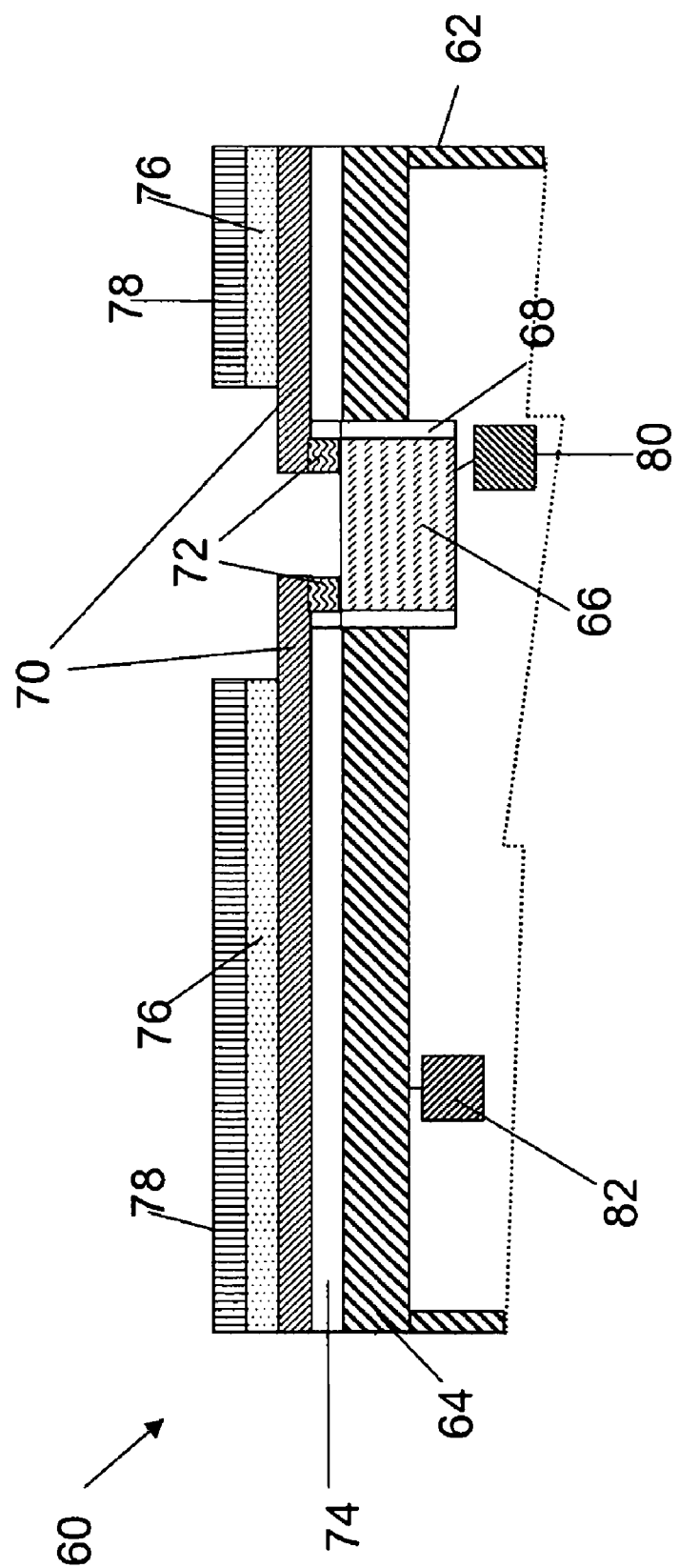
FIG. 5 is a schematic cross-sectional view of yet another embodiment of a lithium-ion battery of the invention.

In still another embodiment, represented by FIG. 5, feed-through device 66 is at lid 64 of cell casing 62, and is electrically insulated from lid 64 by insulating gasket 68 and electrically connected to first conductive layer 70 by electrically conductive bridge 72.

Cell casings 22 and 62 can be of any suitable shape. Preferably, cell casings 22 and 62 each have a prismatic cross section.

The lithium-ion batteries of the invention can further include at least one current-interrupt device (CID) in electrical communication with either the first terminal or the second terminal of the battery. The current interrupt device typically includes a first conductive plate and a second conductive plate in electrical communication with each other. In the current interrupt device, the second conductive plate separates from (e.g., deforms away or is detached from) the first conductive plate when pressure inside the battery is greater than a predetermined value, such as between about 5 and about 10 kg/cm$^2$, whereby a current flow between the second electrode and the second terminal is interrupted. An insulator (e.g., insulating layer or insulating gasket) can be further included between a portion of the first conductive plate and a portion of the second conductive plate. Preferably, at least one of the first conductive plate and the insulator of the current interrupt device includes at least one hole through which gas within the battery is in fluid communication with the second conductive plate. Suitable examples of current interrupt devices that can be employed in the invention can be found, for example, in U.S. Pat. Nos. 4,943,497; 5,418,082; and 6,900,616, the entire teachings of which are incorporated herein by reference.

In one specific embodiment, the lithium-ion batteries of the invention include such a current interrupt device in electrical communication with the second terminal.

The cells or batteries of the invention can be cylindrical or prismatic (stacked or wound), preferably prismatic, and more preferably of a prismatic shape that is oblong. Although the present invention can use all types of prismatic cell casings, an oblong call casing is preferred partly due to the two features described below.

Figure 6B:
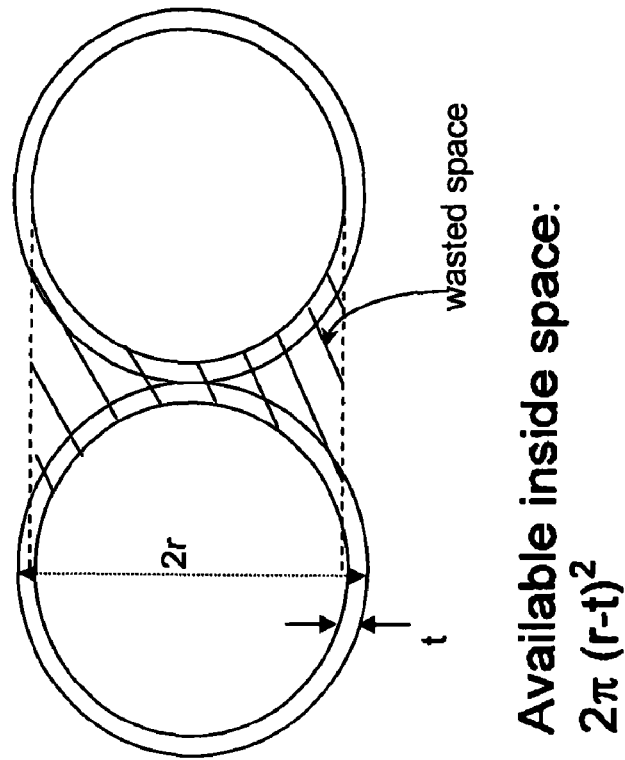
FIGS. 6(a) and 6(b) are schematic drawings comparing different spatial utilizations of different battery form factors including oblong shaped batteries of the invention (FIG. 6(a)) and commercial batteries, including two 18650 cells in parallel (FIG. 6(b)).
Figure 6A:
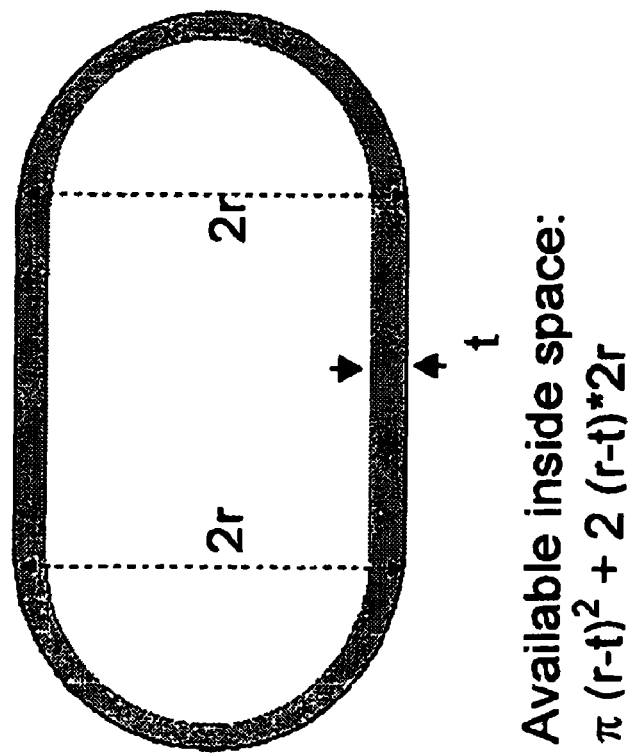

As shown in FIGS. 6(a)-6(b), an advantage a battery of the invention having an oblong cell casing is that a PTC layer disposed over such an oblong shape cell casing can have more surface area than that of two cylindrical cell, such as 18650 cells, by about 16%, when comparing stacks of the same external volume, since the waste space indicated in FIG. 6(b) can be fully utilized in an oblong shape cell as shown in FIG. 6(a).

In addition, the available internal volume of an oblong shape, such as the 183665 form factor, is larger than the volume of two 18650 cells, when comparing stacks of the same external volume. When assembled into a battery pack, the oblong cell fully utilizes more of the space that is occupied by the battery pack. This enables novel design changes to the internal cell components that can increase key performance features without sacrificing cell capacity relative to that found in the industry today. Design features such as mixing in components of higher safety, but relatively lower capacity, while still realizing high capacity on the pack level is therefore available. In addition, again due to the larger available volume, one can elect to use thinner electrodes which have relatively higher cycle life. The thinner electrodes also have higher rate capability. Furthermore an oblong (or prismatic) can has larger flexibility. For instance, an oblong shape can flex more at the waist point compared to a cylindrically shaped can, which allows less flexibility as stack pressure is increasing upon charging. The increased flexibility decreases mechanical fatigue on the electrodes, which in turn causes higher cycle life. Also, separator pore clogging is improved by the relatively lower stack pressure.

A particularly desired feature, allowing relatively higher safety, is available for the oblong shaped battery compared to the prismatic battery. The oblong shape provides a snug fit to the jelly roll, which minimizes the amount of electrolyte necessary for the battery. The relatively lower amount of electrolyte results in less available reactive material during a misuse scenario and hence higher safety. In addition, cost is lower due to a lower amount of electrolyte. In the case of a prismatic can with a stacked electrode structure, whose cross-section is in a rectangular shape, full volume utilization is possible without unnecessary electrolyte, but this type of can design is more difficult and hence more costly from a manufacturing point-of-view.

Figure 7:
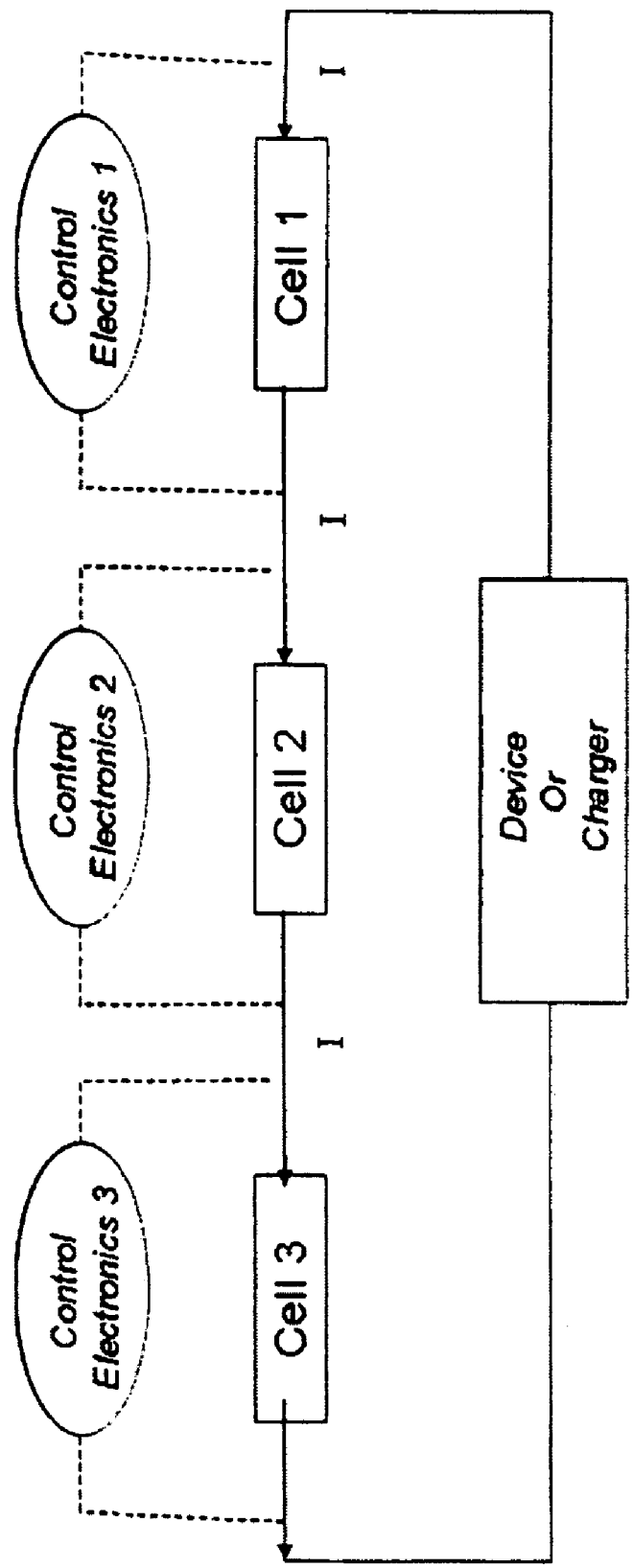
FIG. 7 is a schematic circuitry showing how individual cells in the invention are preferably connected when arranged together in a battery pack.

Referring to FIG. 7, in some embodiments of the invention, a plurality of lithium-ion batteries of the invention (e.g., 2 to 5 cells) can be connected in a battery pack, wherein each of the batteries (cells) is connected with each other in series, parallel, or in series and parallel. In some embodiments, there are no parallel connections between the batteries in the battery packs of the invention.

Preferably, at least one cell of the cells included in the battery packs of the invention has a prismatic shaped cell casing, more preferably oblong shaped cell casing, as shown in FIG. 1. Preferably, the capacity of the cells in the battery pack is typically equal to or greater than about 3.0 Ah, more preferably equal to or greater than about 4.0 Ah. The internal impedance of the cells is preferably less than about 50 milliohms, more preferably less than 30 milliohms.

The lithium-ion batteries and battery packs of the invention can be used for portable power devices, such as portable computers, power tools, toys, portable phones, camcorders, PDAs and the like. In the portable electronic devices using lithium-ion batteries, their charges are in general designed for 4.20 V charging voltage. Thus, the lithium-ion batteries and battery packs of the invention are particularly useful for these portable electronic devices.

The present invention also includes methods of producing a lithium-ion battery as described above. The methods include forming a cell casing as described above, and disposing a first electrode and a second electrode within the cell casing. A PTC laminate as described above for the lithium-ion batteries, is disposed over the lid of the cell casing. In one embodiment, as shown in FIG. 1, the PTC laminate (e.g., conductive layers 34 and 42 and PTC layer 36) and the cover for the battery (e.g., cover 48) are assembled separately from the cell casing containing the electrodes of the battery, and then disposed over the lid of the cell casing (e.g., lid 24). Preferably, in this embodiment, first conductive layer 34 of the PTC laminate is connected feed-through device 16 via welding through openings 35 and 54.

Positive and negative electrodes and electrolytes for the lithium-ion batteries of the invention can be formed by suitable methods known in the art.

Examples of suitable negative active materials for the negative electrodes include any material allowing lithium to be doped or undoped in or from the material. Examples of such materials include carbonaceous materials, for example, non-graphitic carbon, artificial carbon, artificial graphite, natural graphite, pyrolytic carbons, cokes such as pitch coke, needle coke, petroleum coke, graphite, vitreous carbons, or a heat treated organic polymer compound obtained by carbonizing phenol resins, furan resins, or similar, carbon fibers, and activated carbon. Further, metallic lithium, lithium alloys, and an alloy or compound thereof are usable as the negative active materials. In particular, the metal element or semiconductor element allowed to form an alloy or compound with lithium may be a group IV metal element or semiconductor element, such as but not limited to, silicon or tin. In particular amorphous tin, that is doped with a transition metal, such as cobalt or iron/nickel, is a metal that has high promise for anode material in these type batteries. Oxides allowing lithium to be doped or undoped in or out from the oxide at a relatively basic potential, such as iron oxide, ruthenium oxide, molybdenum oxide, tungsten oxide, titanium oxide, and tin oxide, and nitrides can be similarly usable as the negative active materials.

Suitable positive active materials for the positive electrodes include any material known in the art, for example, lithium nickelate (e.g., $LiNiM'O_2$), lithium cobaltate (e.g., $LiCoO_2$), olivine-type compounds (e.g., $LiFePO_4$), manganate spinel (e.g., $Li_{1+x}Mn_{2-x}O_4$ or $Li_{1+x1}(Mn_{1-y1}A'_{y2})_{2-x2}O_{z1}$) and combinations thereof. Various examples of suitable positive active materials can be found in international application No. PCT/US2005/047383, filed on Dec. 23, 2005, and a U.S. patent application Ser. No. 11/474,056 entitled "Lithium-ion Secondary Battery," filed on the same date as the present application under the entire teachings of which are incorporated herein by reference.

Examples of suitable non-aqueous electrolytes include a non-aqueous electrolytic solution prepared by dissolving an electrolyte salt in a non-aqueous solvent, a solid electrolyte (inorganic electrolyte or polymer electrolyte containing an electrolyte salt), and a solid or gel-like electrolyte prepared by mixing or dissolving an electrolyte in a polymer compound or the like.

The non-aqueous electrolytic solution is typically prepared by dissolving a salt in an organic solvent. The organic solvent can include any suitable type that has been generally used for batteries of this type. Examples of such organic solvents include propylene carbonate, ethylene carbonate, diethyl carbonate, dimethyl carbonate, 1,2-dimethoxyethane, 1,2-diethoxyethane, γ-butyrolactone, tetrahydrofuran, 2-methyl tetrahydrofuran, 1,3-dioxolane, 4-methyl-1,3-dioxolane, diethyl ether, sulfolane, methylsulfolane, acetonitrile, propionitrile, anisole, acetate, butyrate, propionate and the like. It is preferred to use cyclic carbonates such as propylene carbonate, or chain carbonates such as dimethyl carbonate and diethyl carbonate. These organic solvents can be used singly or in a combination of two types or more.

Additives or stabilizers may also be present in the electrolyte, such as VC (vinyl carbonate), VEC (vinyl ethylene carbonate), EA (ethylene acetate), TPP (triphenylphosphate), phosphazenes, biphenyl (BP), lithium bis(oxalato)borate (LiBoB), ethylene sulfate (ES) and propylene sulfate. These additives are used as anode and cathode stabilizers or flame retardants, which may make a battery have higher performance in terms of formation, cycle efficiency, safety and life.

The solid electrolyte can include an inorganic electrolyte, a polymer electrolyte and the like insofar as the material has lithium-ion conductivity. The inorganic electrolyte can include, for example, lithium nitride, lithium iodide and the like. The polymer electrolyte is composed of an electrolyte salt and a polymer compound in which the electrolyte salt is dissolved. Examples of the polymer compounds used for the polymer electrolyte include ether-based polymers such as polyethylene oxide and cross-linked polyethylene oxide, polymethacrylate ester-based polymers, acrylate-based polymers and the like. These polymers may be used singly, or in the form of a mixture or a copolymer of two kinds or more.

A matrix of the gel electrolyte may be any polymer insofar as the polymer is gelated by absorbing the above-described non-aqueous electrolytic solution. Examples of the polymers used for the gel electrolyte include fluorocarbon polymers such as polyvinylidene fluoride (PVDF), polyvinylidene-co-hexafluoropropylene (PVDF-HFP) and the like.

Examples of the polymers used for the gel electrolyte also include polyacrylonitrile and a copolymer of polyacrylonitrile. Examples of monomers (vinyl based monomers) used for copolymerization include vinyl acetate, methyl methacrylate, butyl methacylate, methyl acrylate, butyl acrylate, itaconic acid, hydrogenated methyl acrylate, hydrogenated ethyl acrylate, acrlyamide, vinyl chloride, vinylidene fluoride, and vinylidene chloride. Examples of the polymers used for the gel electrolyte further include acrylonitrile-butadiene copolymer rubber, acrylonitrile-butadiene-styrene copolymer resin, acrylonitrile-chlorinated polyethylene-propylene-diene-styrene copolymer resin, acrylonitrile-vinyl chloride copolymer resin, acrylonitrile-methacylate resin, and acrylonitrile-acrylate copolymer resin.

Examples of the polymers used for the gel electrolyte include ether based polymers such as polyethylene oxide, copolymer of polyethylene oxide, and cross-linked polyethylene oxide. Examples of monomers used for copolymerization include polypropylene oxide, methyl methacrylate, butyl methacrylate, methyl acrylate, butyl acrylate.

In particular, from the viewpoint of oxidation-reduction stability, a fluorocarbon polymer is preferably used for the matrix of the gel electrolyte.

The electrolyte salt used in the electrolyte may be any electrolyte salt suitable for batteries of this type. Examples of the electrolyte salts include $LiClO_4$, $LiAsF_6$, $LiPF_6$, $LiBF_4$, $LiB(C_6H_5)_4$, $LiB(C_2O_4)_2$, $CH_3SO_3Li$, $CF_3SO_3Li$, $LiCl$, $LiBr$ and the like. Generally, a separator separates the positive electrode from the negative electrode of the batteries. The separator can include any film-like material having been generally used for forming separators of non-aqueous electrolyte secondary batteries of this type, for example, a microporous polymer film made from polypropylene, polyethylene, or a layered combination of the two. In addition, if a solid electrolyte or gel electrolyte is used as the electrolyte of the battery, the separator does not necessarily need to be provided. A microporous separator made of glass fiber or cellulose material can in certain cases also be used. Separator thickness is typically between 9 and 25 μm.

In some specific embodiments, a positive electrode can be produced by mixing the cathode powders at a specific ratio. 90 wt % of this blend is then mixed together with 5 wt % of acetylene black as a conductive agent, and 5 wt % of PVDF as a binder. The mix is dispersed in N-methyl-2-pyrrolidone (NMP) as a solvent, in order to prepare slurry. This slurry is then applied to both surfaces of an aluminum current collector foil, having a typical thickness of about 20 um, and dried at about 100-150° C. The dried electrode is then calendared by a roll press, to obtain a compressed positive electrode. When $LiCoO_2$ is solely used as the positive electrode a mixture using 94 wt % $LiCoO_2$, 3% acetylene black, and 3% PVDF is typically used. A negative electrode can be prepared by mixing 93 Wt % of graphite as a negative active material, 3 wt % acetylene black, and 4 wt % of PVDF as a binder. The negative mix was also dispersed in N-methyl-2-pyrrolidone as a solvent, in order to prepare the slurry. The negative mix slurry was uniformly applied on both surfaces of a strip-like copper negative current collector foil, having a typical thickness of about 10 um. The dried electrode is then calendared by a roll press to obtain a dense negative electrode.

The negative and positive electrodes and a separator formed of a polyethylene film with micro pores, of thickness 25 um, are generally laminated and spirally wound to produce a spiral type electrode element.

In some embodiments, one or more positive lead strips, made of, e.g., aluminum, are attached to the positive current electrode, and then electrically connected to the positive terminal of the batteries of the invention. A negative lead, made of, e.g., nickel metal, connects the negative electrode, and then attached to a feed-through device, such as feed-through devices 16 and 66. An electrolyte of for instance EC:DMC:DEC with 1M $LiPF_6$, is vacuum filled in the cell casing of a lithium-ion battery of the invention, where the cell casing has the spirally wound "jelly roll".

EQUIVALENTS

While this invention has been particularly shown and described with references to preferred embodiments thereof, it will be understood by those skilled in the art that various changes in form and details may be made therein without departing from the scope of the invention encompassed by the appended claims.

What is claimed is:
1. A lithium-ion battery, comprising:
    a) a first terminal in electrical communication with a first electrode of the battery;
    b) a second terminal in electrical communication with a second electrode of the battery;

c) a cell casing that includes a lid, wherein the lid is in electrical communication with the cell casing and the cell casing is electrically insulated from the first terminal and in electrical communication with the second terminal;

d) a positive thermal coefficient layer, having an increasing electrical resistivity with increasing temperature, in electrical communication with the first terminal of the battery and over the lid of the cell casing;

e) a first conductive layer over the lid of the cell casing;

f) a second conductive layer, wherein at least a portion of the second conductive layer is at least a component of the first terminal, or is electrically connected to the first terminal;

g) a feed-through device electrically connecting the first electrode of the battery to the first terminal; and wherein the positive thermal coefficient layer is between the first and second conductive layers, the first conductive layer is physically connected to the feed-through device, and is over the feed-through device, and each of the lid of the cell casing, the second conductive layer and the positive thermal coefficient layer defines a pass-through hole through which the feed-through device is connected to the first conductive layer.

2. The lithium-ion battery of claim 1, wherein the feed-through device is electrically insulated from each pass-through hole of the lid of the cell casing, the second conductive layer and the positive thermal coefficient layer, while the feed-through device is in electrical communication with the second conductive layer via a portion of a surface of the first conductive layer contacting the positive thermal coefficient layer, and via a portion of a surface of the second conductive layer contacting the positive thermal coefficient layer.

3. The lithium-ion battery of claim 2, wherein the positive thermal coefficient layer covers a portion of a surface of the second conductive layer, whereby a portion of a surface of the second conductive layer that is not covered by the positive thermal coefficient layer serves as the first terminal.

4. The lithium-ion battery of claim 3, further including an insulating layer between the lid of the cell casing and at least a portion of the second conductive layer.

5. The lithium-ion battery of claim 4, wherein the insulating layer is a layer of air.

6. The lithium-ion battery of claim 1, wherein the cell casing defines at least one venting means through which gas within the battery can be released when pressure inside of the battery is greater than a predetermined value.

7. The lithium-ion battery of claim 1, further comprising a current interrupt device in electrical communication with either the first terminal or the second terminal of the battery, the current interrupt device including a first conductive plate and a second conductive plate, the first and second conductive plates being in electrical communication with each other, wherein the second conductive plate separates from the first conductive plate when pressure inside the battery is greater than a predetermined value, whereby a current flow between the second electrode and the second terminal is interrupted.

8. The lithium-ion battery of claim 7, wherein the current interrupt device is in electrical communication with the second terminal.

9. The lithium-ion battery of claim 1, wherein the thermal positive coefficient layer has a surface area greater than the surface area of the first terminal of the battery.

10. The lithium-ion battery of claim 1, wherein the capacity of the battery is equal to or greater than about 3.3 Ah/cell.

11. The lithium-ion battery of claim 1, wherein the cell casing has a prismatic cross-sectional shape.

12. The lithium-ion battery of claim 11, wherein the cell casing has an oblong cross-sectional shape.

13. A battery pack, comprising a plurality of lithium-ion cells, each of the cells including:

a) a first terminal in electrical communication with a first electrode of the battery;

b) a second terminal in electrical communication with a second electrode of the battery;

c) a cell casing that includes a lid, wherein the lid is in electrical communication with the cell casing and the cell casing is electrically insulated from the first terminal and in electrical communication with the second terminal; and d) a positive thermal coefficient layer, having an increasing electrical resistivity with increasing temperature, in electrical communication with the first terminal of the battery and over the lid of the cell casing;

e) a first conductive layer over the lid of the cell casing;

f) a second conductive layer, wherein at least a portion of the second conductive layer is at least a component of the first terminal, or is electrically connected to the first terminal;

g) a feed-through device electrically connecting the first electrode of the battery to the first terminal; and wherein the positive thermal coefficient layer is between the first and second conductive layers, the first conductive layer is physically connected to the feed-through device, and is over the feed-through device, and each of the lid of the cell casing, the second conductive layer and the positive thermal coefficient layer defines a pass-through hole through which the feed-through device is connected to the first conductive layer.

14. The battery pack of claim 13, wherein at least one cell casing has a prismatic cross-sectional shape.

15. The battery pack of claim 14, wherein at least one cell casing has an oblong cross-sectional shape.

16. The battery pack of claim 13, wherein the capacity of each cell is equal to or greater than about 3.3 Ah/cell.

17. The battery pack of claim 13, wherein the internal impedance of each cell is less than about 50 milliohms.

18. The battery pack of claim 13, wherein the cells are in series and no cells are connected in parallel.

19. A method of producing a lithium-ion battery, comprising the steps of:

a) forming a cell casing that includes a lid electrically connected to the cell casing, the cell casing being electrically insulated from a first terminal and in electrical communication with a second terminal;

b) disposing a first electrode and a second electrode within the cell casing, the first and second electrodes being in electrical communication with the first terminal and the second terminal of the battery, respectively;

c) disposing a positive thermal coefficient layer, having an increasing electrical resistivity with increasing temperature, over the lid of the cell casing, the positive thermal coefficient layer being in electrical communication with the first terminal of the battery;

d) disposing a first conductive layer and a second conductive layer over the lid of the cell casing, wherein the positive thermal coefficient layer is between the first and second conductive layers, and wherein at least a portion of the second conductive layer is at least a component of the first terminal, or is electrically connected to the first terminal; and e) forming a feed-through device electrically connecting the first electrode of the battery to the first terminal, wherein the first conductive layer is physically connected to the feed-through device, and is over the feed-through device, and each of the lid of the cell casing, the second conductive layer and the positive thermal coefficient layer defines a pass-through hole through which the feed-through device is connected to the first conductive layer.

20. The method of claim 19, wherein the feed-through device is formed to be electrically insulated from each pass-through hole of the lid of cell casing, the second conductive layer and the positive thermal coefficient layer, while the feed-through device is in electrical communication with the second conductive layer via a portion of a surface of the first conductive layer contacting the positive thermal coefficient layer, and via a portion of a surface of the second conductive layer contacting the positive thermal coefficient layer.

21. The method of claim 20, wherein the positive thermal coefficient layer covers a portion of a surface of the second conductive layer, whereby a portion of a surface of the first conductive layer that is not covered by the positive thermal coefficient layer serves as the first terminal.

22. The method of claim 19, further including the step of forming at least one venting means on the cell casing through which gas within the battery can be released when pressure inside of the battery is greater than a predetermined value.

* * * * *